(No Model.)

N. HOYT.
MUD GUARD FOR BICYCLES.

No. 588,922. Patented Aug. 24, 1897.

WITNESSES

INVENTOR
Nelson Hoyt,
By John Hedderman
Attorney

UNITED STATES PATENT OFFICE.

NELSON HOYT, OF PHILADELPHIA, PENNSYLVANIA, ASSIGNOR OF ONE-HALF TO CHAS. S. HOPPER, OF SAME PLACE.

MUD-GUARD FOR BICYCLES.

SPECIFICATION forming part of Letters Patent No. 588,922, dated August 24, 1897.

Application filed January 14, 1897. Serial No. 619,155. (No model.)

*To all whom it may concern:*

Be it known that I, NELSON HOYT, a citizen of the United States, residing at Philadelphia, in the county of Philadelphia and State of Pennsylvania, have invented certain new and useful Improvements in Mud-Guards for Bicycles; and I do hereby declare the following to be a full, clear, and exact description of the invention, such as will enable others skilled in the art to which it appertains to make and use the same.

This invention relates to improvements in bicycles, and has more particular relation to mud-guards for the same.

The invention consists of certain novel constructions, which will be hereinafter more particularly set forth and claimed.

Figure 1:
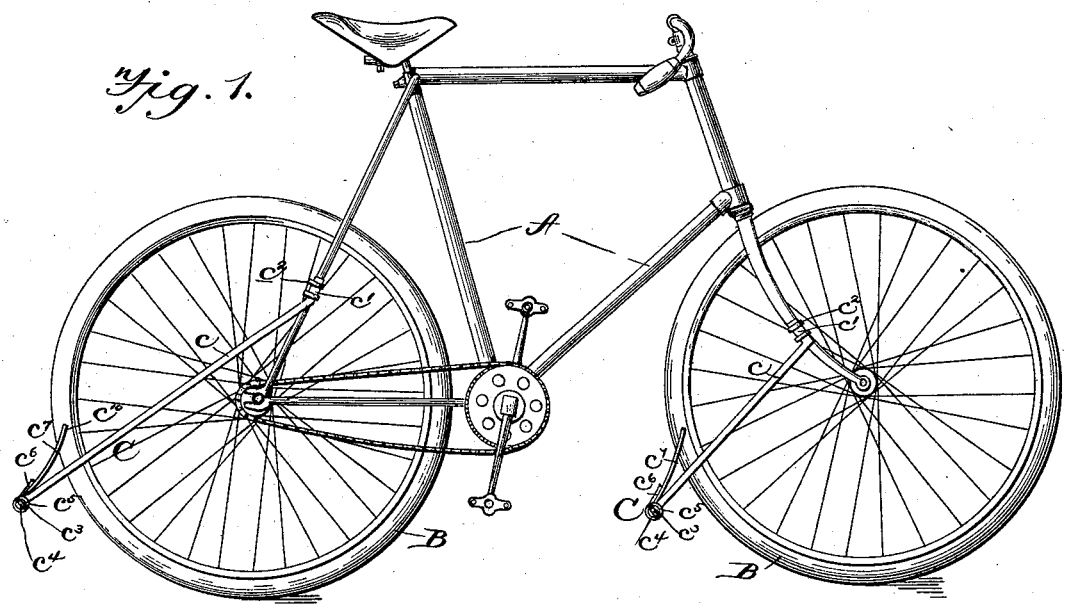
Figure 2:
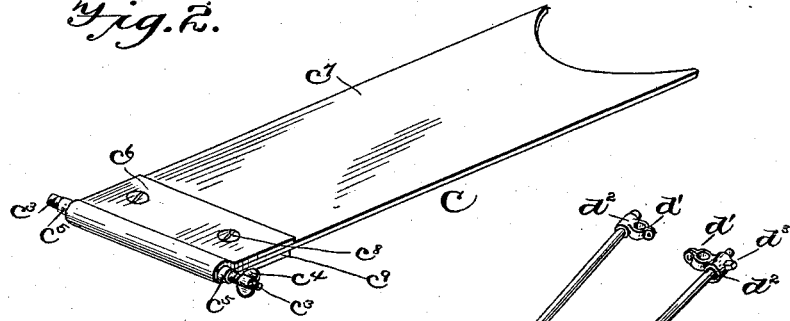

In the accompanying drawings, forming part of this specification, Figure 1 represents a side elevation of a bicycle with my invention applied thereto. Fig. 2 represents an enlarged detail perspective view of my improved attachment, and Fig. 3 represents an enlarged detail perspective view of a modified form of my improvement.

A in the drawings represents the bicycle-frame, B B the wheels, and C my improved mud-guard. This latter comprises two arms $c$ $c$, each having an angular end $c'$, adapted to be secured upon the frame A upon its respective side of the machine by U-shaped clamping-bolts $c^2$. The outer free ends of said arms $c$ are adjustably mounted upon a screw-bolt $c^3$ by means of thumb-nuts $c^4$. Said bolt $c^3$ passes through a sleeve $c^5$, to which it is firmly attached. This sleeve is provided with an attaching-plate $c^6$, to which the scraping-plate proper, $c^7$, is attached by means of screws $c^8$ and a washer-plate $c^9$. The said scraper proper, $c^7$, is preferably constructed of rubber, and is provided at its outer end with a notch or scallop $c^{10}$, adapted to fit the periphery of a wheel. The said flexible scraper $c^7$ may be adjusted either to press directly against the wheel and extend radially therefrom or it may be tipped to one or the other side of this position, as desired, so that it will bear firmly against the periphery of the wheel and scrape all mud and water therefrom.

It will be observed from the foregoing description that the inclination of this flexible scraping-strip $c^7$ may be changed at will by simply loosening the thumb-nut $c^4$ and turning said flexible strip up or down. One of the scraping devices is applied to each wheel of the bicycle in such a position that the scraping-plates strike the peripheries of the tires directly after they leave the ground, so that there will be no chance for the wheels to throw the mud and water clinging thereto.

Figure 3:
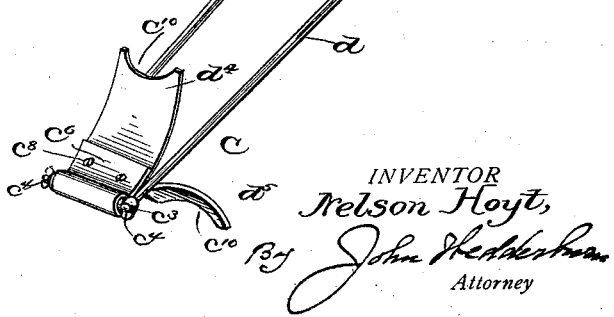

In the modified form of my invention shown in Fig. 3 of the drawings I have connected the supporting-arms $d$ to the frame A by split clamps $d'$, each of which is provided with an apertured lug $d^2$, through which the rod $d$ passes, said rods being adjustably secured in said lugs by set-screws $d^3$, mounted thereon. The scraping device in this modified form comprises two leaves $d^4$ and $d^5$, connected to the ends of the arms in practically the same manner as heretofore described and extending respectively up and down to contact with the periphery of the tire at two independent points. In this construction I preferably form the leaf $d^5$ of heavier material than the leaf $d^4$ and adjust it so that it only slightly engages the periphery of the tire to scrape the mud and water therefrom, while the more flexible leaf $d^4$ wipes over the surface of said tire and removes all remaining mud or moisture.

It will be observed from the foregoing description that this device may be applied to any ordinary construction of wheel by simply clamping the arms in position, as before described, said arms being adjusted according to the size of the wheel so as to cause the scrapers to contact at the proper point upon the tire.

By the employment of my invention the usual unsightly and cumbersome mud-guards are done away with, and light supporting-frames and scrapers substituted in lieu thereof, accomplishing the object sought in a much more scientific and cleanly manner.

By the use of this device the mud cannot be thrown at all, because it is scraped from the wheel almost immediately after it has become attached to the same, and the guard thus serves the twofold purpose of protecting both the rider and the machine.

If so desired, the device may be altogether detached from the machine in fair weather by simply loosening the clamps that secure the supporting-rods in position and detaching said rods.

Having thus described my invention, what I claim as new, and desire to secure by Letters Patent, is—

1. In a mud-guard for cycles, the combination with supporting-arms adapted to be attached to the frame of a cycle, of a rotatable shaft journaled in the free ends of said arms, a flexible scraper mounted on said shaft and means for locking said shaft in any of its adjusted positions whereby the scraper may be moved into alinement with the supporting-arms or adjusted to extend at an angle thereto at will, substantially as described.

2. In a mud-guard for cycles, the combination with supporting-arms adapted to be attached to the frame of the cycle, of a shaft journaled in the free ends of said arms, a flexible scraper mounted on said shaft, screw-threads formed on the respective opposite ends of said shaft and thumb-nuts mounted on said screw-threads whereby the scraper may be adjusted into alinement with the supporting-arms or at any desired inclination in relation thereto and locked in such position, substantially as described.

3. In a mud-guard for cycles, the combination with supporting-arms adapted to be attached to the frame of a cycle, of a shaft journaled between the free ends of said arms, a clip-plate surrounding said shaft and having its respective opposite ends separated, a flexible scraper secured between the ends of said plate, and means for locking the scraper in any of its adjusted positions, substantially as described.

4. In a mud-guard for cycles, the combination with supporting-arms adapted to be attached to the frame of a cycle, of a rotatable shaft mounted between the free ends of said arms, and a plurality of flexible scrapers mounted on said shaft and extending respectively up and down at an angle so as to engage the periphery of the bicycle-wheel upon opposite sides of the shaft, substantially as described.

In testimony whereof I have signed this specification in the presence of two subscribing witnesses.

NELSON HOYT.

Witnesses:
FRANCIS C. ADLER,
FRANCIS S. LAWS.